US008577986B2

(12) United States Patent
Pinkerton et al.

(10) Patent No.: US 8,577,986 B2
(45) Date of Patent: Nov. 5, 2013

(54) MAPPING RDMA SEMANTICS TO HIGH SPEED STORAGE

(75) Inventors: James T. Pinkerton, Sammamish, WA (US); Thomas M. Talpey, Stow, MA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 12/818,952

(22) Filed: Jun. 18, 2010

(65) Prior Publication Data

US 2011/0246598 A1   Oct. 6, 2011

Related U.S. Application Data

(60) Provisional application No. 61/320,596, filed on Apr. 2, 2010.

(51) Int. Cl.
*G06F 15/173* (2006.01)

(52) U.S. Cl.
USPC .......................................... 709/212; 711/100

(58) Field of Classification Search
None
See application file for complete search history.

(56) References Cited

U.S. PATENT DOCUMENTS

| 6,691,146 B1* | 2/2004 | Armstrong et al. ........... 718/100 |
| 7,299,266 B2 | 11/2007 | Boyd et al. |
| 8,190,919 B2* | 5/2012 | Natarajan et al. ............. 713/193 |
| 2004/0107422 A1* | 6/2004 | Cabrera et al. ................ 719/310 |
| 2007/0038749 A1 | 2/2007 | Noya |
| 2007/0208820 A1* | 9/2007 | Makhervaks et al. ......... 709/212 |
| 2007/0288921 A1* | 12/2007 | King et al. ........................ 718/1 |
| 2008/0253395 A1 | 10/2008 | Pandya |
| 2008/0313364 A1 | 12/2008 | Flynn et al. |
| 2009/0113143 A1 | 4/2009 | Domsch |
| 2009/0125604 A1* | 5/2009 | Chang et al. .................. 709/212 |
| 2009/0150605 A1 | 6/2009 | Flynn |
| 2009/0292861 A1 | 11/2009 | Kanevsky et al. |
| 2010/0023595 A1 | 1/2010 | McMillian et al. |
| 2010/0161750 A1* | 6/2010 | Pandya ......................... 709/212 |
| 2011/0137861 A1* | 6/2011 | Burnett et al. ................ 707/622 |

OTHER PUBLICATIONS

Evaluating the Impact of RDMA on Storage I/O over InfiniBand—Published Date: 2004 http://citeseerx.ist.psu.edu/viewdoc/download?doi=10.1.1.10.3226&rep=rep1&type=pdf (11 pages).
Access to InfiniBand* from Linux*—Published Date: Oct. 30, 2009 http://softwareintel.com/en-us/articles/access-to-infiniband-from-linux/ (7 pages).

\* cited by examiner

*Primary Examiner* — Ario Etienne
*Assistant Examiner* — Clayton R Williams
(74) *Attorney, Agent, or Firm* — Workman Nydegger

(57) ABSTRACT

Embodiments described herein are directed to extending remote direct memory access (RDMA) semantics to enable implementation in a local storage system and to providing a management interface for initializing a local data store. A computer system extends RDMA semantics to provide local storage access using RDMA, where extending the RDMA semantics includes the following: mapping RDMA verbs of an RDMA verbs interface to a local data store and altering RDMA ordering semantics to allow out-of-order processing and/or out-of-order completions. The computer system also accesses various portions of the local data store using the extended RDMA semantics.

20 Claims, 4 Drawing Sheets

MAPPING RDMA SEMANTICS TO HIGH SPEED STORAGE

CROSS-REFERENCE TO RELATED APPLICATIONS

This application claims priority to and is a non-provisional application of U.S. Patent Application No. 61/320,596 filed Apr. 2, 2010, entitled "MAPPING RDMA SEMANTICS TO HIGH SPEED STORAGE", and hereby expressly incorporates by reference the entire contents of that application.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, computer systems communicate with each other using different types of software applications. However, such inter-application communication typically requires a processor to process each sent output and each received input. This increased workload can impose excessive overhead on a processor, especially when many thousands or millions of inputs and outputs are being sent between different software applications.

To avoid such processor involvement, while still allowing communication between applications (or between an application and a remote data store), remote direct memory access (RDMA) may be implemented. RDMA allows read and write requests from applications to flow directly from the application to a network storage device or storage server. The read or write request can be satisfied and transferred between the two computers without requiring the involvement of either system's processors.

BRIEF SUMMARY

Embodiments described herein are directed to extending remote direct memory access (RDMA) semantics to enable implementation in a local storage system and to providing a management interface for initializing a local data store. In one embodiment, a computer system extends RDMA semantics to provide local storage access using RDMA, where extending the RDMA semantics includes the following: mapping RDMA verbs of an RDMA verbs interface to a local data store and altering RDMA ordering semantics to allow out-of-order processing and/or out-of-order completions. The computer system also accesses various portions of the local data store using the extended RDMA semantics.

In another embodiment, a computer system instantiates a management interface that is configured to initialize a local persistent data store. The computer system receives an input indicating various settings that are to be applied when initializing the local persistent data store, where at least one of the settings identifies how the local persistent data store is to be partitioned. The computer system partitions the local persistent data store into partitions that are each accessible using the management interface. The computer system also initializes the partitioned local persistent data store as a local RDMA endpoint using the management interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
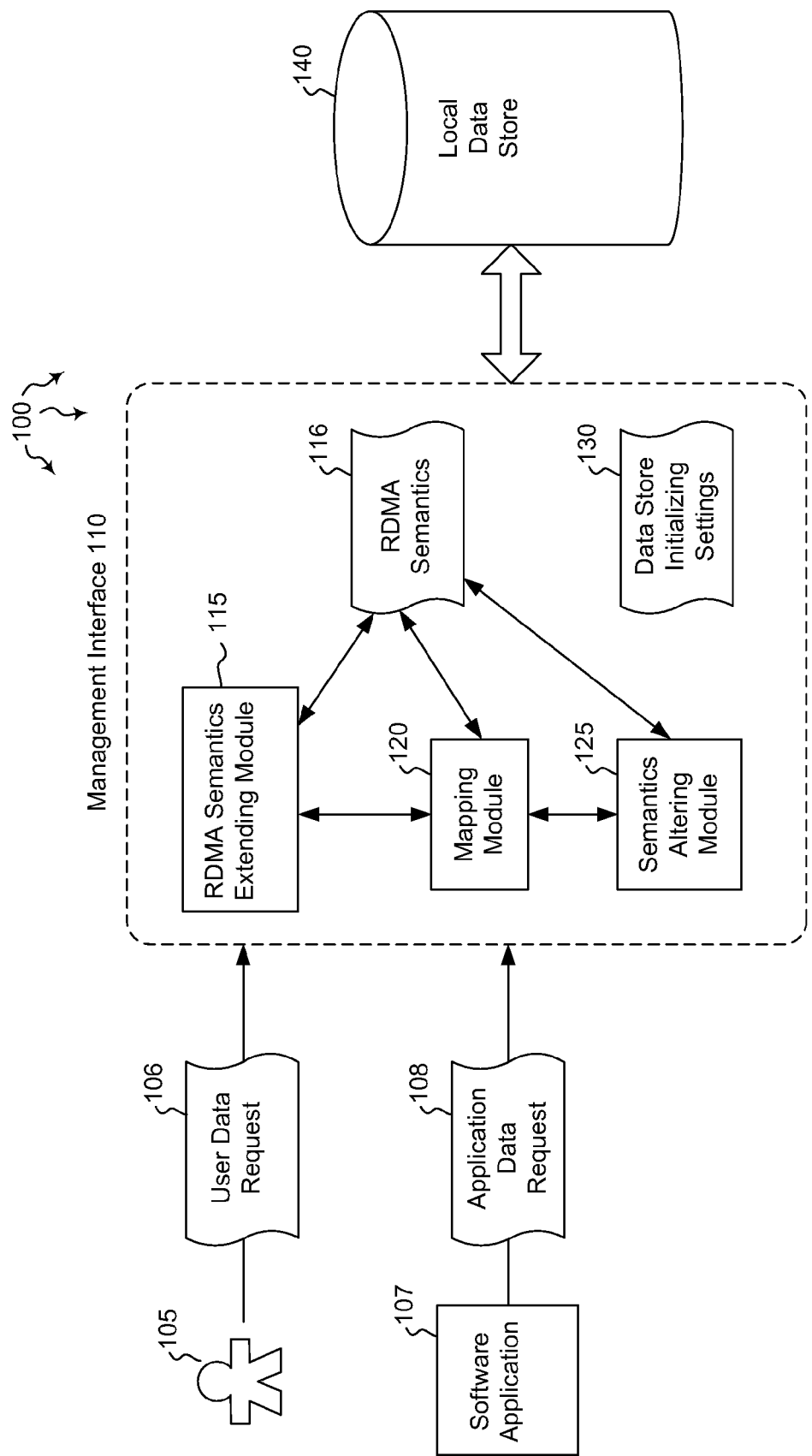
FIG. 1 illustrates a computer architecture in which embodiments of the present invention may operate including extending remote direct memory access (RDMA) semantics to enable implementation in a local storage system.

Embodiments described herein are directed to extending remote direct memory access (RDMA) semantics to enable implementation in a local storage system and to providing a management interface for initializing a local data store. In one embodiment, a computer system extends RDMA semantics to provide local storage access using RDMA, where extending the RDMA semantics includes the following: mapping RDMA verbs of an RDMA verbs interface to a local data store and altering RDMA ordering semantics to allow out-of-order processing and/or out-of-order completions. The computer system also accesses various portions of the local data store using the extended RDMA semantics.

In another embodiment, a computer system instantiates a management interface that is configured to initialize a local persistent data store. The computer system receives an input indicating various settings that are to be applied when initializing the local persistent data store, where at least one of the settings identifies how the local persistent data store is to be partitioned. The computer system partitions the local persistent data store into partitions that are each accessible using the management interface. The computer system also initializes the partitioned local persistent data store as a local RDMA endpoint using the management interface.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes management interface 110. Management interface 110 may be any type of software interface that allows a user to interact with or otherwise use local data store 140. Local data store 140 (or simply "data store" herein) may be any type of data storage system including a magnetic or optical drive, a collection of drives, a database, a storage area network or other storage system. A user 105 may desire to interact with the data store. Such interaction may include storing or modifying stored data. The user may send a data request 106 to management interface 110 which then processes that request using one or more of its internal modules.

For instance, interface 110 may use remote direct memory access (RDMA) semantics extending module to extend RDMA semantics 116 such that these semantics may be used to access data on data store 140. RDMA semantics may include those commands, queries, verbs or other semantics that allow one device or program to talk to another device or program using RDMA. In some cases, mapping module 120 may be used to map various RDMA verbs of an RDMA verbs interface to the local data store. Semantics altering module 125 may be used to alter various RDMA ordering semantics to allow either or both of out-of-order processing and out-of-order completions. Such mappings and alterations (RDMA extensions) may allow a user or software application to access local data store 140 using the extended RDMA semantics. These concepts will be explained in greater detail below with regard to method 200 of FIG. 2.

Figure 2:
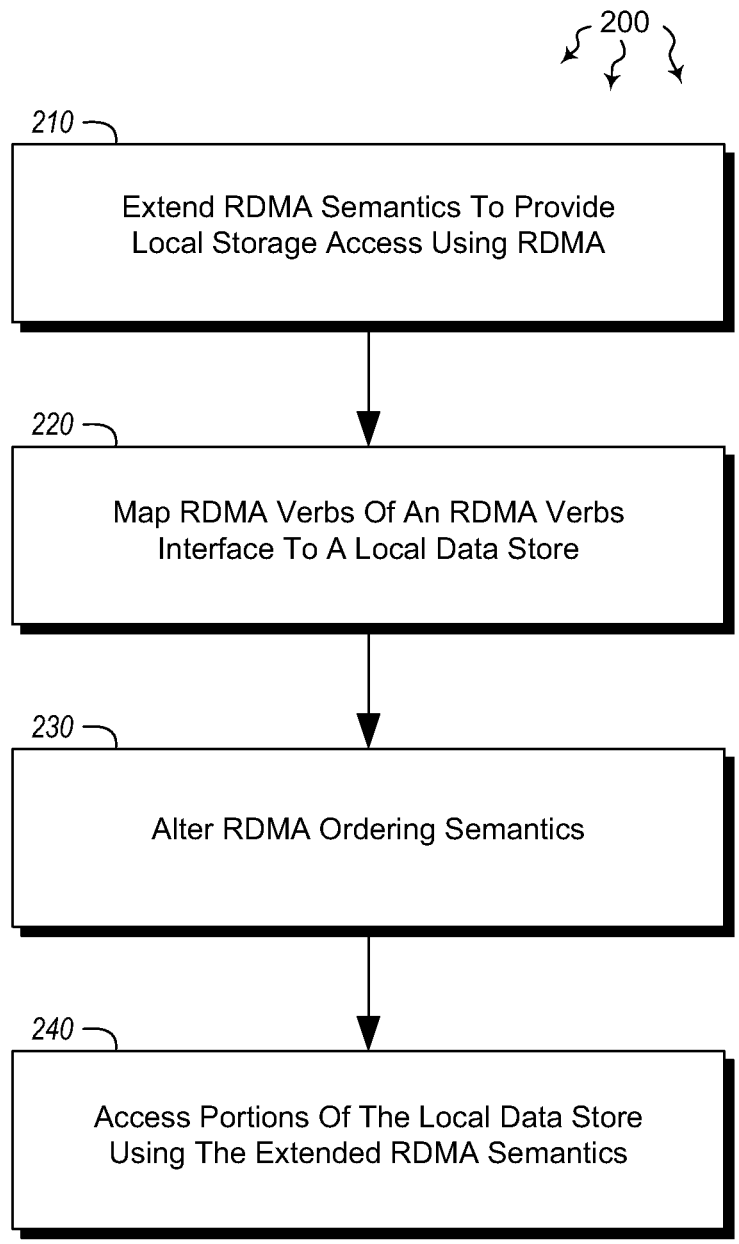
FIG. 2 illustrates a flowchart of an example method for extending remote direct memory access (RDMA) semantics to enable implementation in a local storage system.
Figure 3:
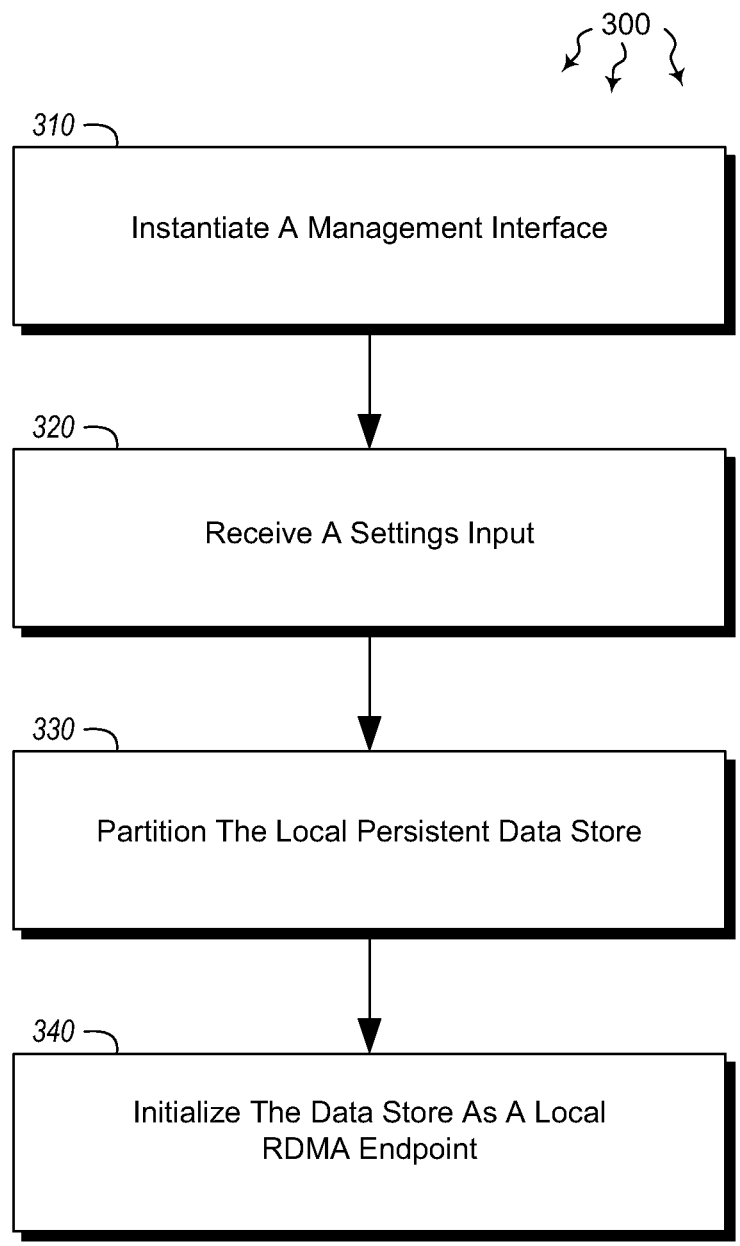
FIG. 3 illustrates a flowchart of an example method for providing a management interface for initializing a local data store.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for extending remote direct memory access (RDMA) semantics to enable implementation in a local storage system. The method 200 will now be described with frequent reference to the components and data of environment 100.

Method 200 includes an act of extending one or more RDMA semantics to provide local storage access using RDMA (act 210). For example, RDMA semantics extending module 115 may extend RDMA semantics 116 to provide access to local data store 140 using RDMA. The RDMA semantics may be extended by adding additional commands or other properties that allow RDMA to be used in conjunction with local storage. In some cases, the extended RDMA semantics may include at least one semantic that reports when each operation has completed. Thus, when, for example, a read or write operation has completed, the semantic reports that the read or write has completed. Many other such semantics may be used, alone, or in conjunction with the aforementioned semantics.

As mentioned above, local data store 140 may include various types of data storage solutions. In some cases, local data store 140 is a memory array-based target device. In other cases, the local data store is some type of flash-based storage. The local data store may be configured to cache various portions of data for a configurable period of time. In some cases, the extended RDMA semantics are configured to provide remote access to the local data store. Thus, user 105 may be able to access local data store 140 remotely using the extended RDMA semantics 116 extended by module 115.

In some cases, as mentioned above, the extended RDMA semantics may include RDMA network application programming interface (API) semantics (or RDMA verbs) that are used for RDMA data access over a network. The RDMA network API may be extended and used to access data stored in a local data store, as well as data stored in a remote data store. Accordingly, the same extended RDMA network API may be used to access both local and remote data from local and remote data stores. Stated in another way, remote data stored in a remote data store may be accessed using the same extended RDMA semantics used to access local data stored in the local data store. In this manner, a single extended RDMA API may be used to access both local and remote data stores.

Method 200 includes an act of mapping one or more RDMA verbs of an RDMA verbs interface to a local data store (act 220). For example, mapping module 120 may map one or more RDMA verbs of an RDMA verbs interface to local data store 140. The RDMA verbs may be mapped to the local data store in a way that allows a user or software application (e.g. 105 or 107, respectively) to access data on the data store using the RDMA verbs. The mapping may also include naming the local data store so that the local data store is recognized as an endpoint by RDMA. Accordingly, when the local data store is recognized as an endpoint, the user or various other software applications can access and use the data store as a typical RDMA endpoint.

Method 200 includes an act of altering one or more RDMA ordering semantics to allow at least one of out-of-order processing and out-of-order completions (act 230). For example, semantics altering module 125 may alter RDMA semantics 116 to allow out-of-order processing and/or out-of-order completions. Out-of-order processing allows management interface 110 to send requests to local data store 140 as the requests are received (e.g. user data request 106 and application data request 108), whereupon the local data store can respond to the requests out of order. Because the requests do not have to be responded to in order, greater flexibility is provided when responding to data requests. Out-of-order completions also provide greater flexibility in that each operation can complete (and signal completion) out-of-order.

In some cases, a user or software program may want (or need) to ensure that a read, write or other operation has completed. In some cases, when using RDMA, pending requests may need to be flushed in order to perform an operation (e.g. a read operation). Such operations may be referred to as barrier operations. Thus, barrier operations ensure that a given data transfer has occurred by flushing pending data transfers and ensuring that the operations are completed. As such, barrier operations may be used to quickly complete an item instead of cancelling that item.

In some embodiments, RDMA's existing fencing capabilities are maintained while still allowing for out-of-order processing and out-of-order completions. For instance, a send queue may be processed out of order, while still maintaining support for a fence operation (the completion portion of a barrier operation). A fence operation verifies that one or more prior events have occurred, whereas the barrier operation ensures that a given data transfer has occurred. Thus, a user may insert something into the send queue that is dependent upon all operations in front of it completing, and the fencing operation ensures that the operations in front of it have completed.

Additionally or alternatively, barrier operations may be processed to flush pending data transfers and ensure the completion of at least one data operation. Moreover, network guarantees provided by RDMA may be selectively relaxed for use with the local data store to the degree indicated by a user. By relaxing these guarantees, local storage implementations that do not necessarily need these guarantees may be implemented in a more efficient manner. Relaxing these guarantees also allows data transfers to be performed in parallel and complete in parallel. As such, faster data access to the data stored in data store 140 may be achieved.

Method 200 includes an act of accessing one or more portions of the local data store using the extended RDMA semantics (act 240). For example, management interface 110 may access local data store 140 using the extended RDMA semantics. Accordingly, once the RDMA semantics extensions have been implemented, user 105 and/or application 107 may access local data store 140 using RDMA. In some cases, the extended RDMA semantics may be implemented in a storage management layer that includes a file system and/or a database.

In some embodiments, software application 107 may establish a link between the application and the local data store 140 using the extended RDMA semantics. The software application may then access at least a portion of application data stored in the local data store using the established link. After the link is established, data may be transferred between the software application and the local data store without any processor involvement. Accordingly, the established link allows data transfer to and from application 107 and local data store 140. This data transfer may occur without any involvement from a central processor at the computer system on which the application is being run. Thus, data may be transferred directly from application memory to the data store (and vice versa) without processor involvement.

Figure 4:
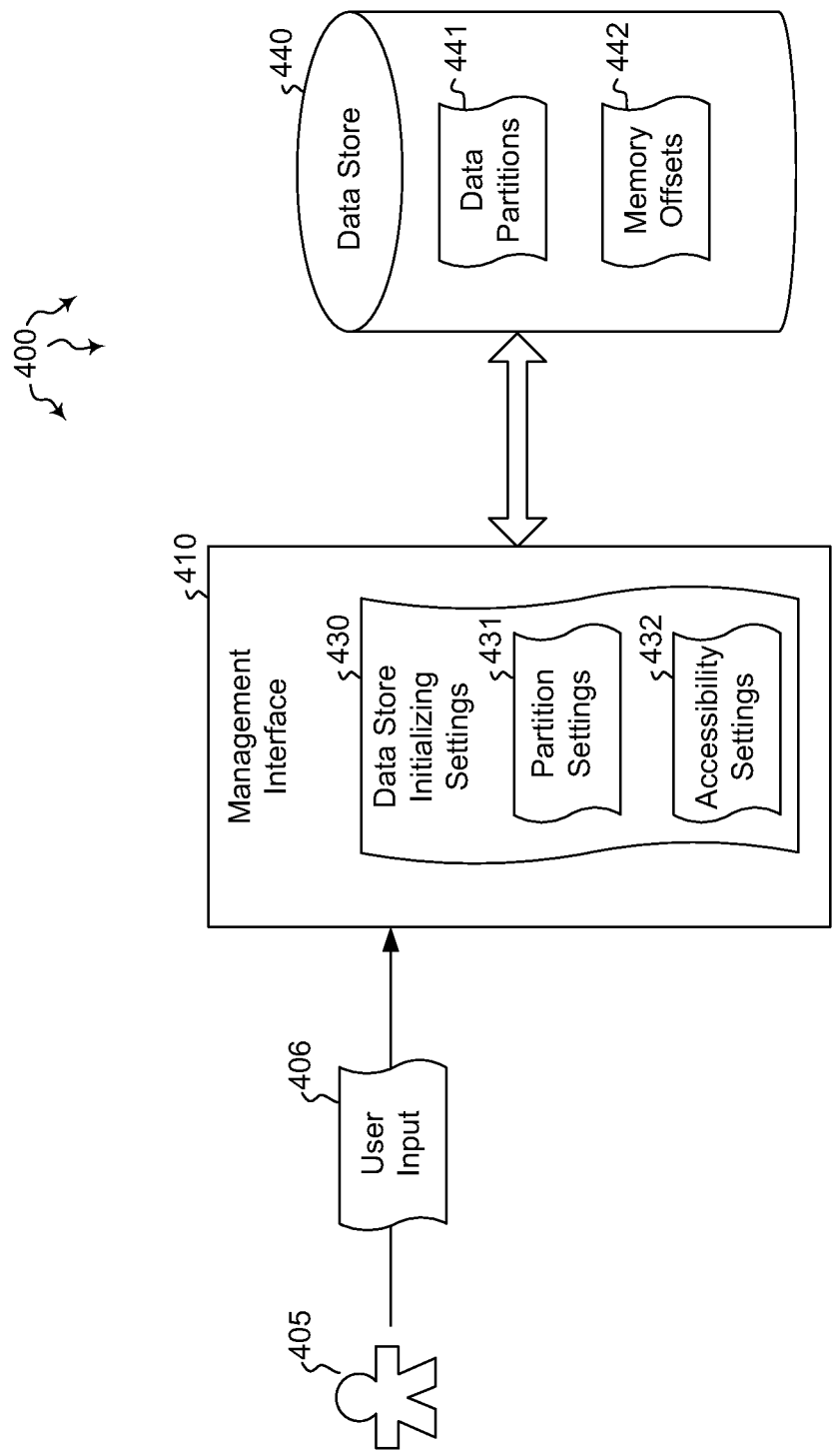
FIG. 4 illustrates an embodiment in which a user interacts with a data store using a management interface.

FIG. 3 illustrates a flowchart of a method 300 for providing a management interface for initializing a local data store. The method 300 will now be described with frequent reference to the components and data of environment 100 of FIG. 1 and environment 400 of FIG. 4.

Method 300 includes an act of instantiating a management interface that is configured to initialize a local persistent data store (act 310). For example, a computer system may instantiate management interface 410 which is configured to initialize local persistent data store 440. The management interface may be any type of software application that allows access to data store 440. In some cases, the management interface may be a third party management interface provided by someone other than the data store provider.

Method 300 includes an act of receiving an input indicating one or more settings that are to be applied when initializing the local persistent data store, wherein at least one of the settings identifies how the local persistent data store is to be partitioned (act 320). For example, management interface 410 may receive user input 406 from user 405 that includes data store initializing settings 130/430. These settings are to be applied when initializing data store 440. For instance, partition settings 431 may indicate how many partitions data store 440 is to be partitioned into, how large each partition is to be, how the memory offsets 442 are to be configured for each partition, as well as other settings. In some embodiments, user 405 may control any or all of the data store initializing settings 430. Management interface 410 may also allow a user to configure user access settings 432 for each partition. Thus, a user may limit access to certain (secure) partitions while granting full access to other partitions.

Method 300 includes an act of partitioning the local persistent data store into one or more partitions that are each accessible using the management interface (act 330). For example, management interface 410 may partition (or initiate partitioning on) local persistent data store 440 into partitions that are accessible using interface 410. The accessibility settings 432 may be applied in conjunction with the partitioning so that access to the newly created partitions is limited according to the accessibility settings.

Method 300 includes an act of initializing the partitioned local persistent data store as a local RDMA endpoint using the management interface (act 340). For example, management interface 410 may initialize the partitioned local persistent data store 440 as a local RDMA endpoint. When the data store has been initialized as an RDMA endpoint, the user can access data in the data store via the management interface via RDMA. Such RDMA endpoint access allows an application to transfer data from application memory directly to one or more partitions on the data store without involving a processor. Moreover, as mentioned above, because, at least in some embodiments, traditional RDMA network guarantees may be relaxed when RDMA is used with local storage, data transfer and other operations may be performed and completed in parallel.

Accordingly, methods, systems and computer program products are provided which extend RDMA semantics to enable data access and data storage in a local storage system using the extended RDMA semantics. Moreover, a management interface may be provided that allows a user or software application to initialize a local data store. The data store may be initialized in a customized manner according to which initialization settings the user has set.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, a computer-implemented method for extending remote direct memory access (RDMA) semantics to enable implementation in a local storage system, the method comprising:
an act of extending one or more RDMA semantics to provide direct access to local storage using RDMA, wherein the direct access bypasses the computer system processor and wherein extending the RDMA semantics comprises the following:
an act of mapping one or more RDMA verbs of an RDMA verbs interface to a local data store;
an act of altering one or more RDMA ordering semantics to allow at least one of out-of-order processing and out-of-order completions for local storage data read and write operations performed on the local data store; and
an act of accessing one or more portions of the local data store using the extended RDMA semantics.

2. The method of claim 1, wherein the mapping includes naming local data stores such that the local data stores are recognized as endpoints by RDMA.

3. The method of claim 1, wherein RDMA's existing fencing capabilities are maintained while allowing for out-of-order processing and out-of-order completions.

4. The method of claim 1, wherein the extended RDMA semantics are implemented in a storage management layer that includes at least one of a file system and a database.

5. The method of claim 1, wherein the extended RDMA semantics include at least one semantic that reports when each operation has completed.

6. The method of claim 1, further comprising an act of a software application establishing a link between the application and the local data store using the extended RDMA semantics.

7. The method of claim 6, wherein the software application accesses at least a portion of application data stored in the local data store using the established link.

8. The method of claim 6, wherein after the link is established, data is transferred between the software application and the local data store without any processor involvement.

9. The method of claim 1, further comprising an act of processing one or more barrier operations to flush pending data transfers and ensure the completion of at least one data operation.

10. The method of claim 1, wherein the local data store comprises a memory array-based target device.

11. The method of claim 1, wherein the local data store comprises flash-based storage.

12. The method of claim 1, wherein one or more portions of data are cached in the local data store.

13. The method of claim 1, wherein the extended RDMA semantics are configured to provide remote access to the local data storage.

14. The method of claim 1, wherein one or more network guarantees provided by RDMA are selectively relaxed for use with the local data store to the degree indicated by a user.

15. A computer program product for implementing a method for providing a management interface for initializing a local data store, the computer program product comprising one or more computer-readable storage devices having stored thereon computer-executable instructions that, when executed by one or more processors of the computing system, cause the computing system to perform the method, the method comprising:
an act of instantiating a management interface that is configured to initialize a local persistent data store;
an act of receiving an input indicating one or more settings that are to be applied when initializing the local persistent data store, wherein at least one of the settings identifies how the local persistent data store is to be partitioned;

an act of partitioning the local persistent data store into one or more partitions that are each accessible using the management interface; and an act of initializing the partitioned local persistent data store as a local RDMA endpoint using the management interface, wherein the local RDMA endpoint includes extended RDMA semantics that provide direct access to the local persistent data store, wherein the direct access bypasses the one or more computer system processors, and further wherein the extended RDMA semantics including RDMA ordering semantics that allow at least one of out-of-order processing and out-of-order completions for local persistent data store data read and write operations performed on the local data store.

16. The computer program product of claim 15, wherein the management interface comprises a third party management interface.

17. The computer program product of claim 15, wherein the management interface allows a user to configure a number of partitions the local persistent data store is to be partitioned into.

18. The computer program product of claim 15, wherein the management interface allows a user to configure user access settings for each partition.

19. The computer program product of claim 15, wherein the management interface allows a user to configure memory offsets for each partition.

20. A computer system comprising the following:
one or more processors;
system memory;
a local data store; and
one or more computer-readable storage devices having stored thereon computer-executable instructions that, when executed by the one or more processors, causes the computing system to perform a method for extending remote direct memory access (RDMA) semantics to enable implementation in the local data store, the method comprising the following:

an act of extending one or more RDMA semantics to provide direct access to the local data store access using RDMA, wherein the direct access bypasses the one or more computer system processors, wherein extending the RDMA semantics comprises the following:

an act of mapping one or more RDMA network API semantics of an RDMA network API semantics interface to the local data store;

an act of altering one or more RDMA ordering semantics to allow at least one of out-of-order processing and out-of-order completions for local storage data read and write operations performed on the local data store;

an act of accessing one or more portions of the local data store from a remote computing system using the extended RDMA network API semantics; and an act of accessing one or more portions of the local data store from the local computing system using the same extended RDMA network API semantics.

* * * * *